Patented Mar. 11, 1924.

1,486,563

UNITED STATES PATENT OFFICE.

PETER H. BERGEN, OF GOESSEL, KANSAS.

COMPOSITION OF MATTER FOR USE AS A LUBRICANT FOR VEHICLE SPRINGS.

No Drawing.    Application filed December 27, 1920. Serial No. 433,400.

*To all whom it may concern:*

Be it known that I, PETER H. BERGEN, a citizen of the United States, residing at Goessel, in the county of Marion and State of Kansas, have invented a new and useful Composition of Matter for Use as a Lubricant for Vehicle Springs, of which the following is a specification.

This invention relates to a composition of matter for use as a lubricant for vehicle springs and for like purposes, and it consists of the following ingredients substantially in the proportions stated, to wit: heavy mineral cup grease (lubricating), 2 parts; whiting, 1 part; perfume, any desired quantity.

The parts are thoroughly mixed and in practice it will be found that the grease will keep the mixture thoroughly smooth and so that it will flow evenly upon the surfaces to which it is applied. The whiting is employed to keep the grease from working out of place and to prevent it from gumming.

The whiting will also keep the grease at the proper temperature and maintain it in a paste form.

The perfume is utilized solely to overcome the objectionable odor of the grease.

It has been found in practice that by placing a composition such as described upon the springs of a vehicle said springs will work easily and be rendered more lasting than where other lubricants are used.

What is claimed is:—

A composition of matter for use on vehicle springs and the like, including heavy mineral cup grease, two parts, whiting one part and a perfume.

In testimony that I claim the foregoing as my own, I have hereto affixed my signature in the presence of two witnesses.

PETER H. BERGEN.

Witnesses:
    JACOB F. VOTH,
    G. H. BERGEN.